United States Patent
Hassanpoor

(10) Patent No.: US 9,276,493 B2
(45) Date of Patent: Mar. 1, 2016

(54) MULTILEVEL CONVERTER WITH CELLS BEING SELECTED BASED ON PHASE ARM CURRENT

(71) Applicant: ABB Technology Ltd, Zürich (CH)

(72) Inventor: Arman Hassanpoor, Ludvika (SE)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 14/435,900

(22) PCT Filed: Nov. 27, 2012

(86) PCT No.: PCT/EP2012/073699
§ 371 (c)(1),
(2) Date: Apr. 15, 2015

(87) PCT Pub. No.: WO2014/082655
PCT Pub. Date: Jun. 5, 2014

(65) Prior Publication Data
US 2015/0280604 A1    Oct. 1, 2015

(51) Int. Cl.
*H02M 7/06* (2006.01)
*H02M 7/483* (2007.01)
*H02M 7/217* (2006.01)

(52) U.S. Cl.
CPC ............ *H02M 7/06* (2013.01); *H02M 7/217* (2013.01); *H02M 7/483* (2013.01); *H02M 2007/4835* (2013.01)

(58) Field of Classification Search
CPC . H02M 3/33592; H02M 7/06; H02M 7/7575; H02M 7/483; H02M 7/217; H02M 1/32; H02M 2007/4835; Y02B 70/126
USPC .................. 363/78, 79, 84, 89, 125, 126, 127
See application file for complete search history.

(56) References Cited

U.S. PATENT DOCUMENTS

| | | | | |
|---|---|---|---|---|
| 5,656,915 | A * | 8/1997 | Eaves ................. | H01M 10/482 320/118 |
| 6,757,185 | B2 * | 6/2004 | Rojas Romero .... | H02M 1/4216 363/89 |
| 2003/0128563 | A1 * | 7/2003 | Rojas Romero .... | H02M 1/4216 363/89 |
| 2004/0022081 | A1 * | 2/2004 | Erickson ............... | H02M 5/297 363/159 |
| 2006/0215425 | A1 * | 9/2006 | Fu ......................... | H02M 7/219 363/37 |
| 2010/0060235 | A1 | 3/2010 | Dommaschk et al. | |
| 2011/0222323 | A1 * | 9/2011 | Dofnas ................. | H02M 7/483 363/71 |
| 2012/0026767 | A1 * | 2/2012 | Inoue .................... | H02M 7/217 363/89 |

(Continued)

FOREIGN PATENT DOCUMENTS

| | | |
|---|---|---|
| CA | 2 663 324 A1 | 10/2010 |
| CN | 102130619 A | 7/2011 |

(Continued)

*Primary Examiner* — Adolf Berhane
(74) *Attorney, Agent, or Firm* — Birch, Stewart, Kolasch & Birch, LLP

(57) ABSTRACT

A method and computer program product are provided for selecting switching cells for voltage contribution in a phase arm of a multilevel converter, a cell selecting control device for a multilevel converter and a multilevel converter. The cell selecting control device and multilevel converter includes a balancing control element that obtains a reference voltage for the phase arm, obtains a measurement of the current running through the phase arm and selects cells for contributing to an AC voltage output from the multilevel converter based on the reference voltage and the magnitude of the phase arm current.

20 Claims, 5 Drawing Sheets

(56) References Cited

U.S. PATENT DOCUMENTS

| | | |
|---|---|---|
| 2012/0068555 A1 | 3/2012 | Aiello et al. |
| 2013/0258726 A1* | 10/2013 | Mukherjee ............... H02J 3/36 363/40 |
| 2014/0002048 A1 | 1/2014 | Pang et al. |
| 2014/0226373 A1* | 8/2014 | Park ....................... H02M 1/12 363/35 |
| 2014/0355321 A1* | 12/2014 | Akagi .................. H02M 7/483 363/131 |
| 2015/0207434 A1* | 7/2015 | Wang .................... H02M 7/483 363/78 |

FOREIGN PATENT DOCUMENTS

| | | |
|---|---|---|
| CN | 102195508 A | 9/2011 |
| WO | WO 2010/145705 A1 | 12/2010 |
| WO | WO 2011/050847 A1 | 5/2011 |
| WO | WO 2011/150964 A1 | 12/2011 |

* cited by examiner

MULTILEVEL CONVERTER WITH CELLS BEING SELECTED BASED ON PHASE ARM CURRENT

FIELD OF INVENTION

The present invention generally relates to multilevel converters. More particularly the present invention relates to a method and computer program product for selecting switching cells for voltage contribution in a phase arm of a multilevel converter, a cell selecting control device for a multilevel converter and a multilevel converter.

BACKGROUND

Multilevel converters are of interest to use in a number of different power transmission environments. They may for instance be used as voltage source converters in direct current power transmission systems. They may also be used as reactive compensation circuits such as Static VAR compensators. The multilevel converter is then typically based on a number of converter cells, where a cell essentially provides a voltage contribution that is either zero or based on the voltage of an energy storage element of the cell, such as the voltage across a cell capacitor.

In the operation of these multilevel converters there is typically provided a reference voltage which the cells are together switched to resemble. Furthermore, in operation the cells will typically be charged or discharged. In order to allow this charging and discharging the cells may furthermore operate in a cell voltage range that is bounded by an upper and a lower cell voltage boundary. A cell is typically not allowed to have a voltage above the upper cell voltage boundary or below the lower cell voltage boundary.

In this switching the cells are thus switched both for obtaining the reference voltage and in order for the cell voltage not to go outside of the cell voltage range, which latter control is also termed cell voltage balancing. However, switching is associated with losses as well as other undesirable phenomena such as the causing of ripple. It is therefore of interest to reduce the switching One way of reducing the switching for load balancing purposes is described in CN102130619A1, where cells with highest and lowest cell voltages are selected based on the current direction.

There is however still a need for improvement in the way that cells are switched in a multilevel converter in order to reduce the switching losses.

SUMMARY OF THE INVENTION

The present invention is directed towards reducing the losses caused by switching in a multilevel converter.

This object is according to a first aspect of the present invention achieved through an method of selecting switching cells for voltage contribution in a phase arm of a multilevel converter operating to convert between alternating current (AC) and direct current (DC),
the method being performed by a voltage balancing element of the converter and comprising
selecting cells for contributing to an AC voltage output from the multilevel converter based on a reference voltage of the phase arm and a magnitude of a phase arm current.

This object is according to a second aspect of the present invention achieved through a cell selecting control device for a multilevel converter operating to convert between alternating current (AC) and direct current (DC) and comprising at least one phase arm with cells, the cell selecting control device comprising a balancing control element configured to
obtain a reference voltage for the phase arm,
obtain a measurement of the current running through the phase arm, and
select cells for contributing to an AC voltage output from the multilevel converter based on the reference voltage and the magnitude of the phase arm current.

The object is according to a third aspect of the present invention furthermore achieved through a multilevel converter operating to convert between alternating current (AC) and direct current (DC) and comprising
at least one phase arm with a number of cells,
a phase arm current detector configured to measure the current running through the phase arm,
a control unit comprising
a voltage level control element configured to provide a reference voltage for the phase arm, and
a balancing control element according to the second aspect.

The object is according to a fourth aspect of the present invention also achieved through a computer program product for selecting cells for voltage contribution in a phase arm of a voltage source converter operating to convert between alternating current (AC) and direct current (DC),
the computer program product being provided as a data carrier comprising computer program code configured to cause a balancing control element of a cell selecting control device to, when the computer program code is loaded into the cell selecting control device
obtain a reference voltage for the phase arm,
obtain measurements of the current running through the phase arm, and
select cells for contributing to an AC voltage output from the multilevel converter based on the reference voltage and the magnitude of the phase arm current.

The present invention has a number of advantages. It allows the switching made at high current levels in the multilevel converter to be minimized, which leads to lower total switching losses of the multilevel converter. The invention also allows the switching frequency to be kept low and combined with keeping the system performance in an acceptable range.

BRIEF DESCRIPTION OF THE DRAWINGS

The present invention will in the following be described with reference being made to the accompanying drawings, where FIG. 1 schematically shows a cell-based voltage source converter connected between two poles, FIG. 2 schematically shows the structure of a first type of voltage source converter cell, FIG. 3 schematically shows the structure of a second type of voltage source converter cell, FIG. 4 schematically shows the structure of a third type of voltage source converter cell, FIG. 5 schematically shows the current and voltage of a phase arm of the voltage source converter, FIG. 6 schematically shows a flow chart of a method of selecting cells according to a first embodiment of the invention, FIG. 7 schematically shows a flow chart of a method of selecting cells according to a second embodiment of the invention, and FIG. 8 schematically shows a computer program product comprising computer program code for implementing a method of the invention.

DETAILED DESCRIPTION OF THE INVENTION

In the following, a detailed description of preferred embodiments of the invention will be given.

Figure 1:
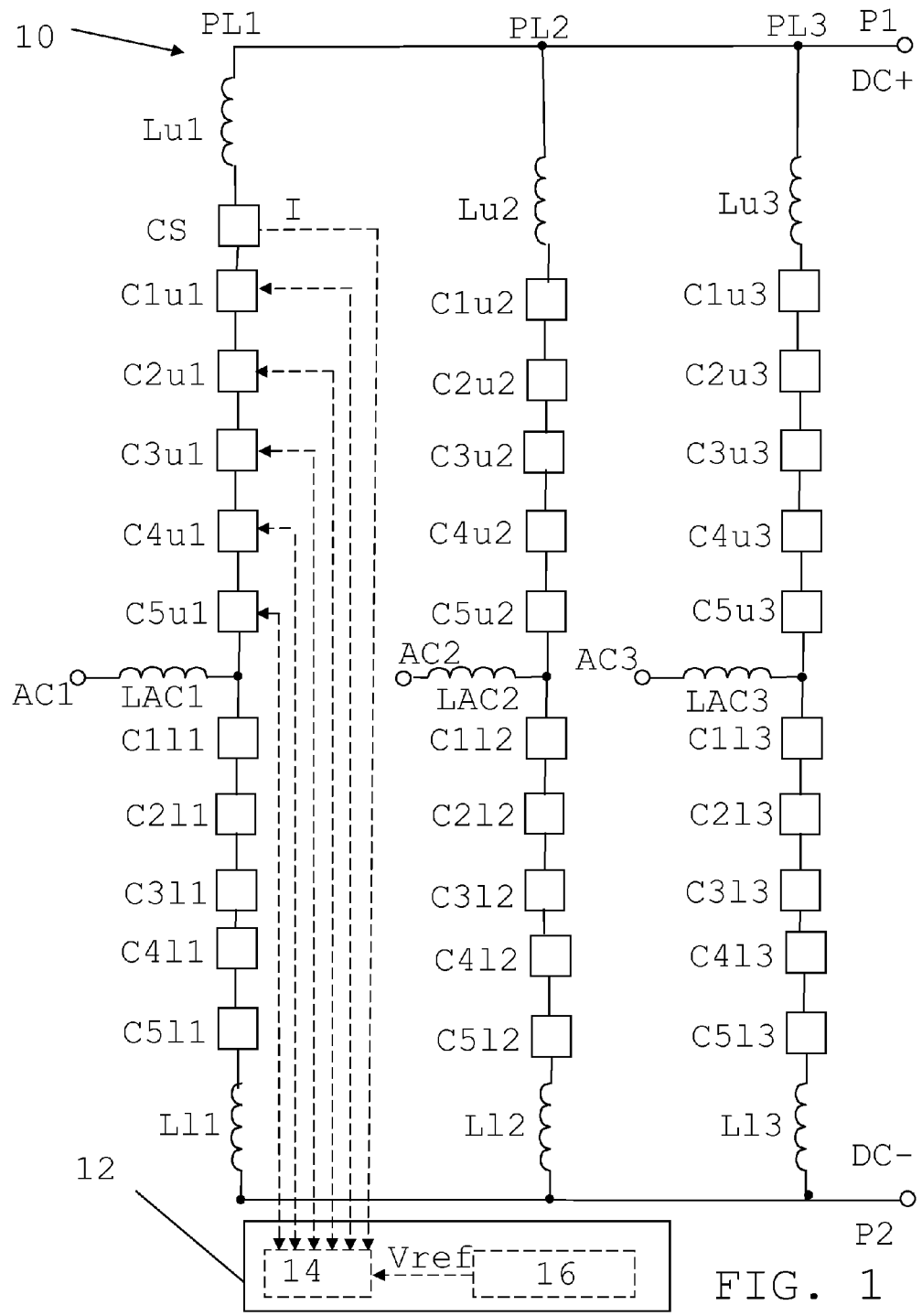

FIG. 1 shows one variation of a multilevel converter in the form of a cell based voltage source converter 10.

The converter operates to convert between alternating current (AC) and direct current (DC). The converter 10 comprises a three-phase bridge made up of a number of phase legs. There are in this case three phase legs. It should however be realized that as an alternative there may be for instance only two phase legs. There is thus a first phase leg PL1, a second phase leg PL2 and a third phase leg PL3. The phase legs are more particularly connected between two DC poles P1 and P2 and the mid points of the phase legs are connected to corresponding alternating current terminals AC1, AC2, AC3. The midpoint of a phase leg is here connected to a corresponding AC terminal via a reactor LAC1, LAC2 and LAC3. A phase leg is thereby divided into two halves, an upper half and a lower half, where such a half is also termed a phase arm.

Each phase leg PL1, PL2, PL3 has a first and second end point. In a converter of the type depicted in FIG. 1 the first end points of all the phase legs PL1, PL2 PL3 are connected to a first DC terminal DC+ while the second end points are connected to a second DC terminal DC−, where the first DC terminal DC+ forms the first pole P1 and the second DC terminal forms the second pole P2. These poles may furthermore be part of a DC power transmission system such as a High Voltage Direct Current (HVDC) power transmission system.

As mentioned above, the voltage source converter of FIG. 1 is only one example of a multilevel converter where the invention may be used. It is for instance possible to provide the three phase legs in series with each other between the two poles, where these then make up a first set of phase legs. It is then possible to provide a second set of series-connected phase legs in parallel with the first set. In this case the midpoints of the phase legs of the first set forms primary AC terminals and the midpoints of the phase legs of the second set forms secondary AC terminals for the three phases.

Yet another realization of a multilevel converter is a static VAR compensator.

The phase arms of the voltage source converter 10 in the first example in FIG. 1 comprise cells. A cell is a unit that may be switched for providing a voltage contribution to the voltage on the corresponding AC terminal. A cell then comprises one or more energy storage elements, for instance in the form of capacitors, and the cell may be switched to provide a voltage contribution corresponding to the voltage of the energy storage element or a zero voltage contribution. If more than one energy storage element is included in a cell it is possible with even further voltage contributions. A cell that has been set for providing a voltage contribution is in the following also termed an inserted cell.

The cells are with advantage connected in series or in cascade in a phase arm.

In the present example there are five series-connected or cascaded cells in each phase arm. Thus the upper phase arm of the first phase leg PL1 includes five cells C1$u$1, C2$u$1, C3$u$1, C4$u$1 and C5$u$1, while the lower phase arm of the first phase leg PL1 includes five cells C1/1, C2/1, C3/1, C4/1 and C5/1. In a similar fashion the upper phase arm of the second phase leg PL2 includes five cells C1$u$2, C2$u$2, C3$u$2, C4$u$2 and C5$u$2 while the lower phase arm of the second phase leg PL2 includes five cells C1/2, C2/2, C3/2, C4/2 and C5/2. Finally the upper phase arm of the third phase leg PL3 includes five cells C1$u$3, C2$u$3, C3$u$3, C4$u$3 and C5$u$3 while the lower phase arm of the third phase leg PL3 includes five cells C1/3, C2/3, C3/3, C4/3 and C5/3. The number of cells provided in FIG. 1 is only chosen for exemplifying the principles of the present invention. It therefore has to be stressed that the number of cells in a phase arm may vary It is often favorable to have many more cells in each phase arm, especially in HVDC applications. A phase arm may for instance comprise hundreds of cells. There may however also be fewer.

Control of each cell in a phase arm is normally done through providing the cell with a control signal directed towards controlling the contribution of that cell to meeting a reference voltage. The reference voltage may be provided for obtaining a waveform on the AC terminal of a phase leg, for instance a sine wave. In order to control the cells there is therefore a control unit 12 comprising a balancing control element 14 and a reference voltage providing element 16.

The control unit 12 is provided for controlling all the phase arms of the converter. However, in order to simplify the description of the invention only the control of the upper phase arm of the first phase leg PL will be described. This phase arm is in FIG. 1 shown as comprising a current sensor CS or phase arm current detector. The sensor CS provides a current sensor signal I to the balancing control element 14. The balancing control element 14 also receives voltage measurements of the voltages of the cells C1$u$1, C2$u$1, C3$u$1, C4$u$1 and C5$u$1, as well as a reference voltage Vref from the reference voltage providing element 16. The reference voltage providing element is with advantage a high level control element that provides a reference voltage Vref in a known way based on the current to be supplied to the DC pole, the AC and Dc voltages and the power to be supplied through the converter. Based on the inputs that it receives, the balancing control element 14 then provides control signals that are applied to the cells C1$u$1, C2$u$1, C3$u$1, C4$u$1 and C5$u$1 for selectively switching them to assist in forming the waveform of the reference voltage Vref.

Therefore, the reference voltage providing element 16 in essence provides information that is used for determining how many cells that are to be switched in the upper phase arm of the first phase leg PL1. The balancing control element 14 then determines which of the cells of this upper phase arm should in fact be switched, which determination is made based on the phase arm current I, the cell voltage measurements of the cells C1$u$1, C2$u$1, C3$u$1, C4$u$1 and C5$u$1 of the phase arm and the reference voltage Vref. The communication between the cells C1$u$1, C2$u$1, C3$u$1, C4$u$1 and C5$u$1 and the balancing control element 14 is indicated by dashed bidirectional arrows, while the current measurements I and reference voltage Vref are indicated with dashed unidirectional arrows.

The other phase arms are controlled in a similar manner in order to form output waveforms on the three AC terminals AC1, AC2 and AC3. In the example given here the output is a three-phase voltage.

There are a number of different cell types that can be used, where three will be described in the following.

Figure 2:
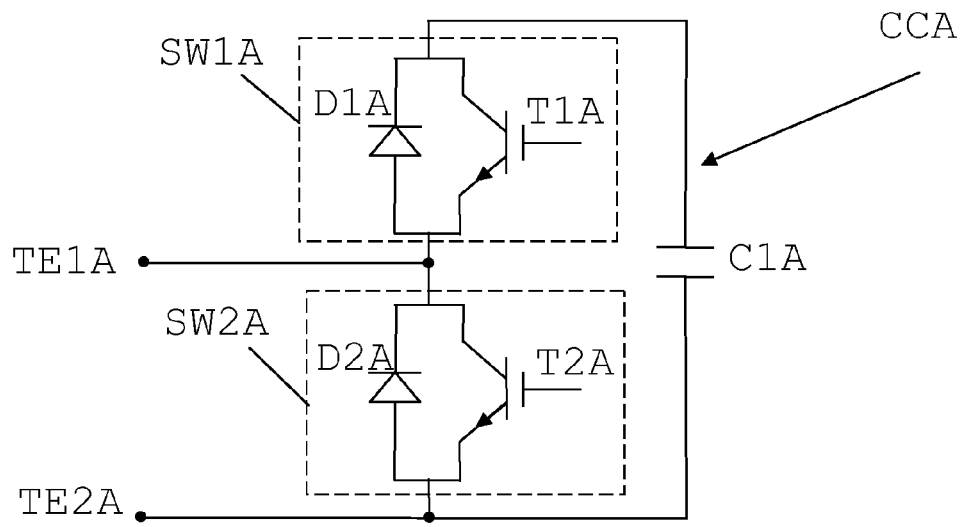

FIG. 2 schematically shows a first type of converter cell CCA. The cell CCA is a half-bridge converter cell and includes an energy storage element, here in the form of a capacitor C1A, which is connected in parallel with a first group of switches. The switches in the first group are connected in series with each other. The first group here includes two switches SW1A and SW2A (shown as dashed boxes), where each switch SW1A, SW2A may be realized in the form of a switching element that may be an IGBT (Insulated Gate Bipolar Transistor) transistor together with an anti-parallel diode. In FIG. 2 there is therefore a first switch SW1A having a first transistor T1A with a first diode D1A oriented upwards in the figure, which is towards the capacitor C1A, and connected in parallel between emitter and collector of the transistor T1A. The direction of conductivity of the diode is thereby from the emitter to the collector. There is also a second switch SW2A connected in series with the first switch SW1A and having a second diode D2A with the same orientation as the first diode D1A and connected in parallel between emitter and collector of a second transistor T2A. This first type of cell CCA comprises a first connection terminal TE1A and a second connection terminal TE2A, each providing a connection for the cell to a phase arm of the voltage source converter. In this first type of cell the first connection terminal TE1A more particularly provides a connection from the phase arm to the junction between the first and the second switch SW1A and SW2A, while the second connection terminal TE2A provides a connection from the phase arm to the junction between the second switch SW2A and the capacitor C1A. These connection terminals TE1A and TE1B thus provide points where the cell can be connected to the phase arm. The connection of the first connection terminal TE1A thus joins the phase arm with the connection point or junction between two of the series connected switches of the first group, here the first and second switches SW1A and SW2A, while the connection of the second connection terminal TE2A joins the phase arm with a connection point between the first group of series connected switches and the energy storage element, which is here the connection point between the second switch SW2A and the first capacitor C1A.

Figure 3:
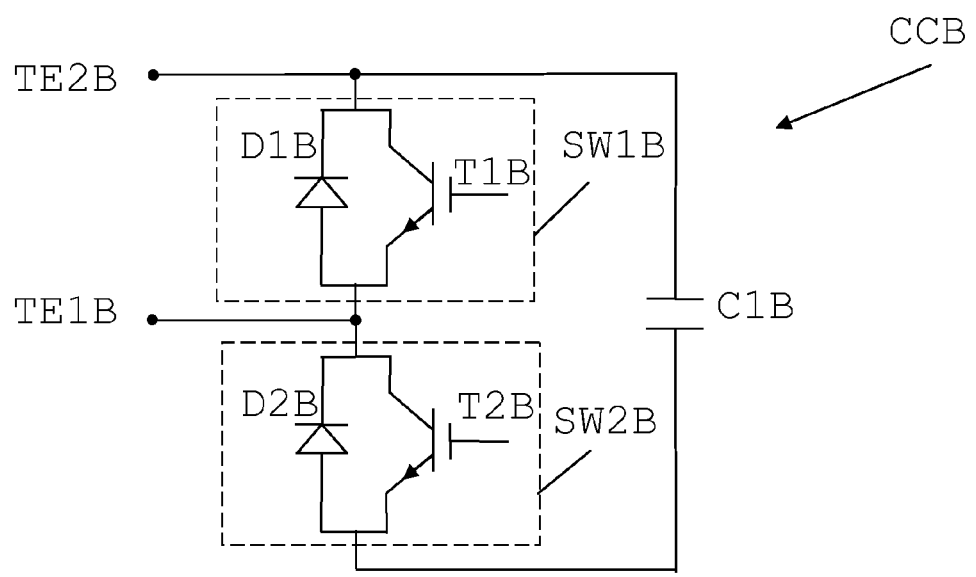

FIG. 3 schematically shows a second type of cell CCB, which is also a half-bridge converter cell. This second type of cell has the same type of components as the first type of cell and is interconnected in the same way. There is thus here a first group of switches including a first switch SW1B (shown as a dashed box) having a first transistor T1B and a first anti-parallel diode D1B in series with a second switch SW2B (also shown as a dashed box) having a second transistor T2B with a second anti-parallel diode D2B. In parallel with this first group of switches there is a first energy storage element, also here in the form of a capacitor C1B, where the first switch SW1B of this cell CCB according to this second type has the same position and orientation as the first switch of the first type and the second switch SW2B of this second type has the same position and orientation as the second switch of the first type. There is also here a first connection terminal TE1B providing a connection between the phase arm and the connection point between the first and the second switches SW1B and SW2B. However as opposed to the cell of the first variation the second connection terminal TE2B here provides a connection between the phase arm and the junction between the first switch SW1B and the capacitor C1B.

Figure 4:
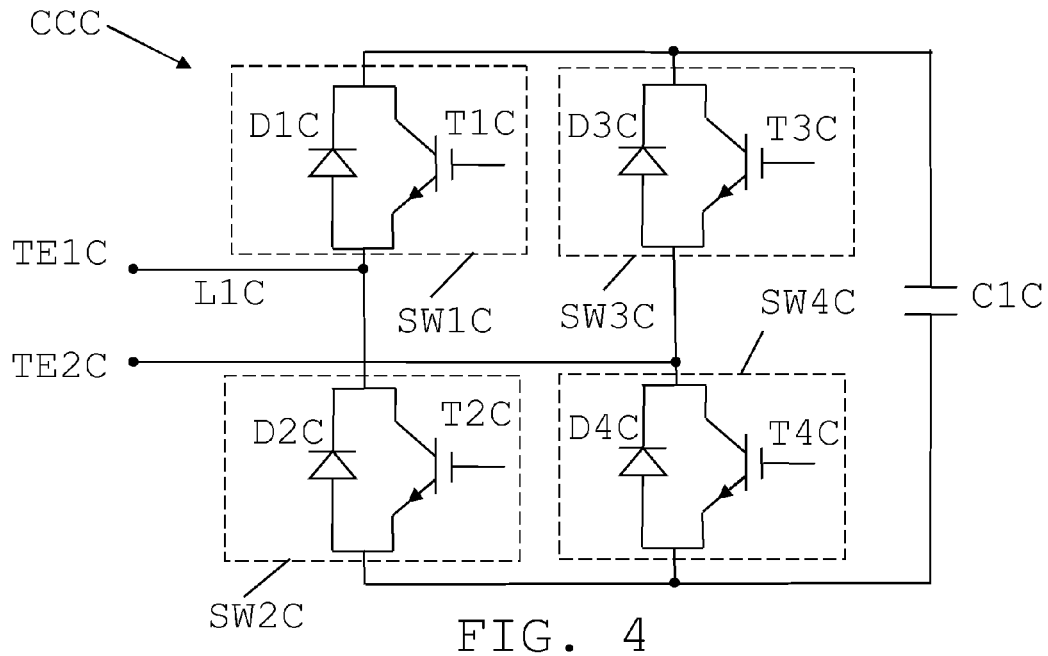

FIG. 4 schematically shows a third type of converter cell CCC including the same type of components having the same orientation, i.e. a first and a second switches SW1C and SW2C each including a first and a second transistor T1C and T2C with anti-parallel first and second diodes D1C and D2C in a first group or branch provided in parallel with an energy storage element, also here realized as a capacitor C1C. These switches SW1C and SW2C in the first group are provided in the same way as in the previously described cells. However here there is a second group of switches connected in series with each other. This second group of switches is here connected in parallel with the first group as well as with the energy storage element. The second group here includes a third and a fourth switch SW3C and SW4C, provided through a third transistor T3C with anti-parallel third diode D3C and through a fourth transistor T4C with anti-parallel fourth diode D4C having the same orientation as the first and second diodes. This second group is thus provided in a further branch in parallel with the capacitor C1C. As before, a first connection terminal TE1C here provides a connection between the phase arm and the junction between the first and the second switches SW1C and SW2C. However the second connection terminal TE2C here also differs. In this third type of cell it provides a connection between the phase arm and a connection point between two of the series connected switches in the second group, and here this connection is provided via the junction between the third and fourth switches SW3C and SW4C.

As opposed to the cells of the first and second variations, this cell CCC is a full-bridge cell.

These three types of cells are merely a few of the possible cell variations. It is for instance possible with cells providing more voltage levels for example using more than one energy storage element. A cell may as one example comprise two energy storage elements where a single of these may be connected for providing a voltage contribution. Alternatively the elements may be connected in parallel or in series with each other in order to enable the creation of various further cell voltage contributions.

As was mentioned earlier, when operating a voltage source converter, the cells are switched for meeting a reference voltage. If the cells are considered to provide the same voltage contribution, which is the voltage across the energy storage element, it can then be seen that the number of cells selected are the number that are required to meet the reference voltage. This means that a number of cells are being switched for providing a voltage corresponding to the reference voltage at a certain instance in time. Furthermore, the cell voltages may be provided within a cell voltage range, i.e. there is a lowest cell voltage that a cell may have and a highest cell voltage that the cell may have. Thereby there is an upper cell voltage boundary and a lower cell voltage boundary. The reason for this is that the cells may both receive and deliver electrical power, where the cell voltage of a cell delivering power will decrease and the cell voltage of a cell receiving electrical power will increase. Through providing such an operating range, it is possible to handle the delivery and receiving of power in a controlled manner. Cells should then not be allowed to have their cell voltages rise above the upper boundary or have their cell voltages fall below the lower boundary. The control for ensuring this is often termed voltage balancing.

It can thus be seen that the cells are subject to two types of switching, switching for meeting a reference voltage and voltage balancing switching because a cell has reached a cell voltage boundary.

All types of switching cause losses. Many converters are furthermore used in power transmission systems, where the need to keep the losses to a minimum is essential. There is therefore always a need for limiting the switching losses. The switching required for meeting a reference voltage has been previously studied and sequences that reduce the amount of switching have been proposed. However, there is room for improvement in the field of voltage balancing.

The present invention is therefore directed towards providing an improved switching especially when considering voltage balancing.

The following discussion will furthermore be made in relation to one phase arm, here exemplified by the upper phase arm of the first phase leg PL1. Similar types of reasoning may be made in relation to the other phase arms.

The conventional carrier based PWM methods have proved to have very robust performance and are easily implemented. However, there are some limitations in their use:

The problem with conventional switching schemes is that the current level of the phase arm is not considered at the time of switching. This means that there may be unnecessary switching activities at high current levels, which introduces high switching losses. It is possible to improve the voltage balancing by selecting the cells from a sorted list at each point in time when switching is to be performed. However, if the current level is not considered the switching losses would still be high at high phase arm current.

In the following a switching pulse pattern where the current levels are considered is first formulated and solved mathematically in order to obtain a switching phase pattern which has low switching losses while keeping the capacitor voltages balanced. Thereafter a practical simplified method is described which obtains similar results. The invention proposes to replace many switching activities at high current levels by switching activities at lower current levels in order to lower switching losses combined with keeping of the system performance in an acceptable range.

The mathematical approach, which forms a first embodiment of the invention, will now be described in more detail.

Figure 5:
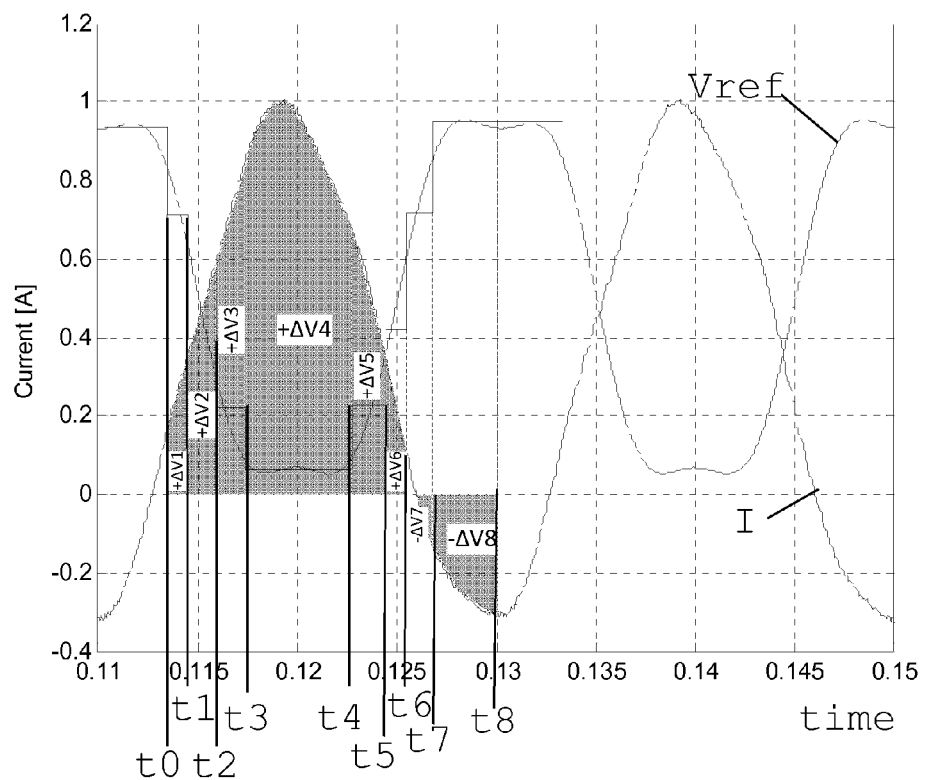

FIG. 5 shows a sample curve of the reference voltage (Vref) to be provided together with the normalized phase arm current I, i.e. the phase arm current divided by its maximum value. It can be seen that both the voltage and current are periodic, where the current is a sine wave with a DC component. The curves in FIG. 5 thus show the required voltage level Vref in each time instance, which voltage level may become discretized due to the finite number of cells.

Also various discrete switching times are shown, where there is a first switching time t0, a second switching time t1, a third switching time t2, a fourth switching time t3, a fifth switching time t4, a sixth switching time t5, a seventh switching time t6, an eighth switching time t7 and a ninth switching time t8. It should be realized that the time steps shown are mere examples use din order to show the principles of the invention. There may be many more time steps.

Furthermore a voltage change corresponding to the integration of the current between these switching times is also shown, where there is a first voltage change $+\Delta V1$ between the times t0 and t1, a second voltage change $+\Delta V2$ between the times t1 and t2, a third voltage change $+\Delta V3$ between the times t2 and t3, a fourth voltage change $+\Delta V4$ between the times t3 and t4, a fifth voltage change $+\Delta V5$ between the times t4 and t5, a sixth voltage change $+\Delta V6$ between the times t5 and t6, a seventh voltage change $-\Delta V7$ between the times t6 and t7 and an eighth voltage change $-\Delta V8$ between the times t7 and t8.

Furthermore, the first, second, third, fourth, fifth and sixth voltage changes $+\Delta V1-+\Delta V6$ are positive voltage changes involving a charging of inserted cells, while the seventh and eighth voltage changes $-\Delta V7$ and $-\Delta V8$ are negative voltage changes involving discharging of inserted cells. The first time t0 is also the time following directly after a current zero crossing, which in this example is a zero crossing followed by a positive arm current. The zero crossing thereby initiates a charging interval. As an alternative the first time may be a switching time coinciding with the zero crossing. It should as another alternative be realized that the first switching time may be a switching time following immediately after or coinciding with a zero crossing that initiates a discharging interval.

Figure 6:
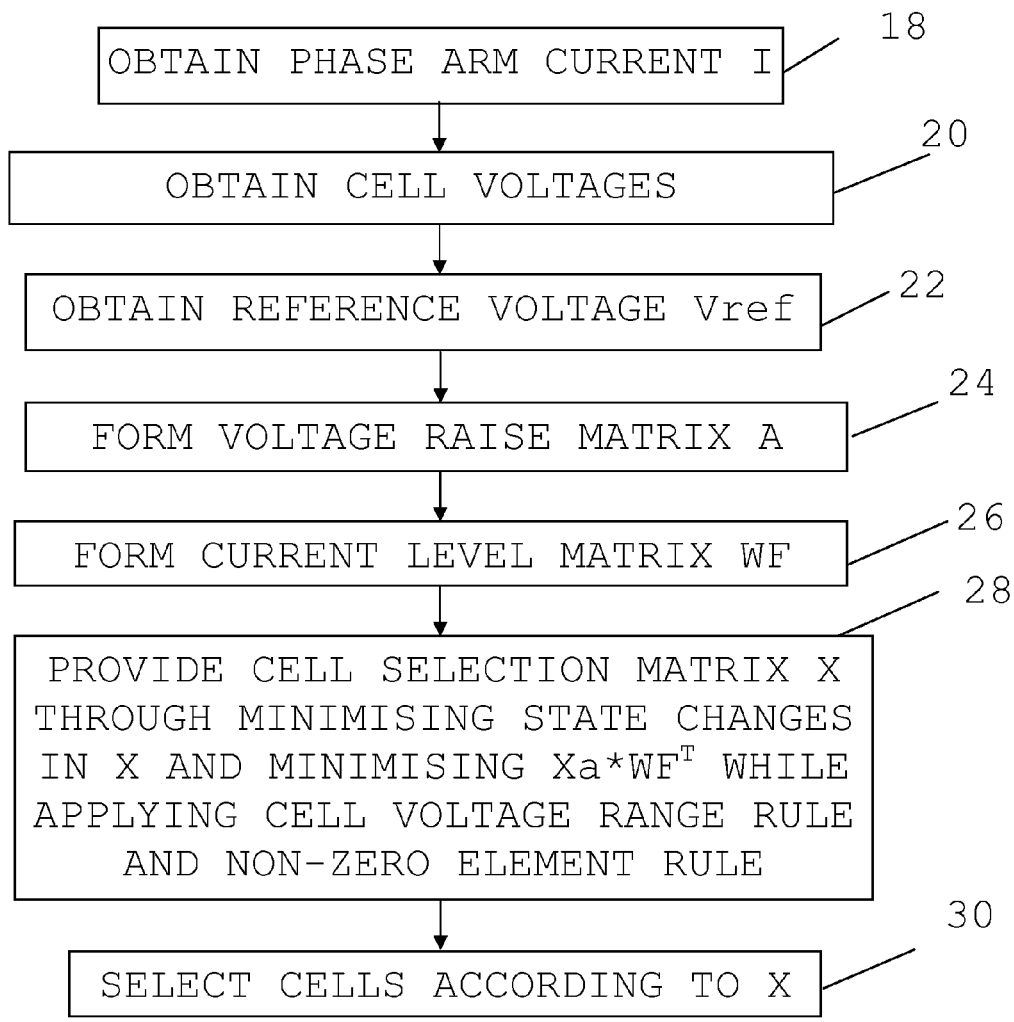

FIG. 6 shows a flow chart of method steps in a method of selecting cells according to a first embodiment of the invention, which method steps are performed in the balancing control element 14.

The method of the first embodiment starts with the balancing control element 14 receiving measurements of the arm current I from the current sensor CS, step 18, and cell voltage measurements from the cells C1u1, C2u1, C3u1, C4u1 and C5u1, step 20. It also receives the reference voltage Vref from the reference voltage providing element 16, step 22.

After this input data has been received, the balancing control element 14 organizes the cells for limiting switching at high phase arm current levels. This organizing may furthermore be triggered by the detecting of a current zero crossing of the phase arm current and in this example the detection of a current zero crossing initiating a charging interval.

In this organizing, the balancing control element 16 forms a voltage change matrix A, step 24. The voltage change matrix is supposed to define a relationship between cells to be used for meeting the reference voltage Vref and the change in cell voltage caused by the phase arm current I.

Therefore, the columns in the voltage change matrix A correspond to cells and the rows to switching times. In the matrix A, a number of cells that are to be switched for meeting the voltage reference at a given point in time receives a value. The value they receive is furthermore a value corresponding to the change in voltage of the cell caused by the integration of the current.

A voltage change matrix A is thus formed based on the current in the phase arm and the reference voltage of the phase arm at a number of discrete time instances, starting from t0 and ending at tn, where n may be 8 as in FIG. 5. However it is often considerably higher. If the phase arm is to provide a periodic waveform, then the spacing between and the number of time instances may be selected so that one period is covered. The trigger for forming the voltage change matrix may furthermore be the determination or detection of a zero crossing. The starting point is thus a current zero crossing and as an example a zero crossing that initiates a charging interval. It should however be realized that the starting point for the creation of the matrix could as an alternative be a zero crossing initiating a discharging interval.

1. t0 is thus the beginning of a charging interval.
2. Reference voltage Vref indicates required number of cells to be inserted or switched for providing a voltage contribution, which for the first switching time t0 is for instance 4 cells.
3. The integration of current in this time step between t0 and t1 shows the amount of voltage increase, $\Delta V1$, in the inserted cells caused by the insertion. It should here be realized that the integrated current of FIG. 5 corresponds to the total voltage added to the inserted cells, while the value $\Delta V1$ in the voltage change matrix A is the voltage change of a single cell.
4. The same trend can then be followed for the rest of the time steps, i.e. for the rest of the switching time instances, and the Voltage Change matrix A is thereby created.

Thus a matrix A is created where each matrix position corresponds to the state of a cell at certain point in time. A cell that is to be switched for providing a voltage contribution at a certain point in time is then given a voltage value corresponding to the integration of the current between this point in time and a following point in time. This voltage value furthermore has a sign corresponding to the current direction, where a positive current that charges the cell involves a positive sign and a negative direction that involves discharging the cell is provided with a negative sign. A voltage change matrix A built based on the voltages in FIG. 5 is shown below.

$$A = \begin{array}{c} \\ t0 \\ t1 \\ t2 \\ t3 \\ t4 \\ t5 \\ t6 \\ t7 \end{array} \begin{pmatrix} C1u1 & C2u1 & C3u1 & C4u1 & C5u1 \\ \Delta V1 & \Delta V1 & \Delta V1 & \Delta V1 & 0 \\ \Delta V2 & \Delta V2 & \Delta V2 & 0 & 0 \\ \Delta V3 & \Delta V3 & 0 & 0 & 0 \\ \Delta V4 & 0 & 0 & 0 & 0 \\ \Delta V5 & \Delta V5 & 0 & 0 & 0 \\ \Delta V6 & \Delta V6 & \Delta V6 & 0 & 0 \\ -\Delta V7 & -\Delta V7 & -\Delta V7 & -\Delta V7 & 0 \\ -\Delta V8 & -\Delta V8 & -\Delta V8 & -\Delta V8 & -\Delta V8 \end{pmatrix}$$

A more general expression for the voltage change matrix can be formed as $$A = \begin{pmatrix} C(1) & C(2) & \ldots & C(k) & C(k+1) & \ldots & C(i) & C(i+1) & \ldots & C(N) \\ \Delta V1 & \Delta V1 & \ldots & \Delta V1 & \ldots & \ldots & \Delta V1 & 0 & \ldots & 0 \\ \Delta V2 & \Delta V2 & \ldots & \Delta V2 & 0 & \ldots & 0 & 0 & \ldots & 0 \\ \vdots & & & \vdots & \vdots & \vdots & & \vdots & & \vdots \\ \vdots & & & \vdots & \vdots & \vdots & & \vdots & & \vdots \\ \Delta V(n-1) & & & \vdots & \vdots & \vdots & & 0 & & \\ \Delta V(n) & & & \vdots & \vdots & \vdots & & 0 & & \end{pmatrix} \begin{array}{c} t0 \\ t1 \\ \vdots \\ \vdots \\ \vdots \\ tn-1 \\ tn \end{array}$$

where C denotes a cell, N is the total number of cells in the phase arm and n is the number of sampling times within the period of the reference voltage.

In this way a matrix A is built that represents the cells to be inserted and the cell voltage change caused by the phase arm current while at the same time considering the direction of current.

There are some details that may be worth mentioning about the Voltage Change Matrix A:

Matrix A can as an example be built up based on pulse width modulation (PWM), Nearest Level Control (NLC) and Harmonic Elimination Method (HEM) etc.

Actually, the voltage ripple is not considered in the matrix A but this can be obtained by rearranging the row elements in a way that the summation of each column is placed between the upper and lower cell voltage boundaries Vmin and Vmax (capacitor voltage ripple limits).

It is furthermore possible to expand the voltage change matrix A through providing the whole row with the same voltage. The zero value matrix positions will thus receive the same value as the rest of the positions in the row. This extended voltage change matrix B is shown below and the use of it will be described later.

The extended voltage change matrix for the example in FIG. 5, will then be $$B = \begin{array}{c} \\ t0 \\ t1 \\ t2 \\ t3 \\ t4 \\ t5 \\ t6 \\ t7 \end{array} \begin{pmatrix} C1u1 & C2u1 & C3u1 & C4u1 & C5u1 \\ \Delta V1 & \Delta V1 & \Delta V1 & \Delta V1 & \Delta V1 \\ \Delta V2 & \Delta V2 & \Delta V2 & \Delta V2 & \Delta V2 \\ \Delta V3 & \Delta V3 & \Delta V3 & \Delta V3 & \Delta V3 \\ \Delta V4 & \Delta V4 & \Delta V4 & \Delta V4 & \Delta V4 \\ \Delta V5 & \Delta V5 & \Delta V5 & \Delta V5 & \Delta V5 \\ \Delta V6 & \Delta V6 & \Delta V6 & \Delta V6 & \Delta V6 \\ -\Delta V7 & -\Delta V7 & -\Delta V7 & -\Delta V7 & -\Delta V7 \\ -\Delta V8 & -\Delta V8 & -\Delta V8 & -\Delta V8 & -\Delta V8 \end{pmatrix}$$

The generalized extended voltage change matrix would then be $$B = \begin{pmatrix} C(1) & C(2) & \ldots & C(k) & C(k+1) & \ldots & C(i) & C(i+1) & \ldots & C(N) \\ \Delta V1 & \Delta V1 & \ldots & \Delta V1 & \ldots & \ldots & \Delta V1 & \Delta V1 & \ldots & \Delta V1 \\ \Delta V2 & \Delta V2 & \ldots & \Delta V2 & \Delta V2 & \ldots & \Delta V2 & \Delta V2 & \ldots & \Delta V2 \\ \vdots & & & \vdots & \vdots & \vdots & & \vdots & & \vdots \\ \vdots & & & \vdots & \vdots & \vdots & & \vdots & & \vdots \\ \Delta V(n-1) & & & \vdots & \vdots & \vdots & & \Delta V(n-1) & & \\ \Delta V(n) & & & \vdots & \vdots & \vdots & & \Delta V(n) & & \end{pmatrix} \begin{array}{c} t0 \\ t1 \\ \vdots \\ \vdots \\ \vdots \\ tn-1 \\ tn \end{array}$$

The object of the mathematical approach is to obtain a cell selection matrix X indicating which cells are to be used at different time intervals. The cell selection matrix may then be considered to provide a switching pulse pattern indicating how and when the cells are to be switched. The purpose is therefore to obtain a matrix that considers the current and the reference voltage in order to reduce the losses caused by the switching.

An exemplifying cell selection matrix based on the example of FIG. 5 may then look like:

$$X = \begin{pmatrix} 1 & 1 & 1 & 1 & 0 \\ 1 & 1 & 1 & 0 & 0 \\ 0 & 1 & 1 & 0 & 0 \\ 0 & 0 & 0 & 1 & 0 \\ 0 & 0 & 0 & 1 & 1 \\ 1 & 1 & 0 & 0 & 1 \\ 1 & 1 & 1 & 1 & 0 \\ 1 & 1 & 1 & 1 & 1 \end{pmatrix}$$

In this matrix the columns represent cells and the rows switching time instances, where a one indicates that a cell is to be on and a zero that it is to be off, i.e. a one indicates that the corresponding cell is to be inserted. A more general cell selection matrix may be defined as:

$$X = \begin{array}{c} C(1) \ C(2) \ \ldots \ C(k) \ C(k+1) \ \ldots \ C(i) \ C(i+1) \ \ldots \ C(N) \\ \begin{vmatrix} S_{1,1} & S_{1,2} & \ldots & S_{1,k} & \ldots & \ldots & S_{1,i} & S_{1,i+1} & \ldots & S_{1,n} \\ S_{2,1} & S_{2,2} & \ldots & S_{2,k} & S_{2,k+1} & \ldots & S_{2,i} & S_{2,i+1} & \ldots & S_{2,n} \\ \vdots & \vdots & & \vdots & \vdots & \vdots & & & & \vdots \\ \vdots & & & \vdots & \vdots & \vdots & & & & \vdots \\ \vdots & & & \vdots & \vdots & \vdots & & & & \vdots \\ S_{n-1,1} & & & \vdots & \vdots & \vdots & & & & S_{n-1,n} \\ S_{n,1} & & & \vdots & \vdots & \vdots & & & & S_{n,n} \end{vmatrix} \begin{matrix} t0 \\ t1 \\ \vdots \\ \vdots \\ \vdots \\ m-1 \\ m \end{matrix} \end{array}$$

where S indicates the status of the cell, which may be one or zero.

It should here be realized that the coefficients of the cell selection matrix X are in fact not known, but will be set based on the voltage change matrix and based on a further matrix.

In order to obtain the coefficients of the cell selection matrix X it may be necessary to use a current level matrix WF.

By sampling and normalizing the current waveform with the same time step resolution as is used in the voltage change matrix A, a current level matrix (WF) can be created, step 26.

The current level matrix for the example in FIG. 5 may be obtained as $$WF = \begin{array}{c} ix \\ \begin{vmatrix} i_0 \\ i_1 \\ i_2 \\ i_3 \\ i_4 \\ i_5 \\ i_6 \\ i_7 \end{vmatrix} \begin{matrix} t0 \\ t1 \\ t2 \\ t3 \\ t4 \\ t5 \\ t6 \\ t7 \end{matrix} \end{array}$$

while a more general matrix would be obtained as $$WF = \begin{vmatrix} i_0 & t0 \\ i_1 & t1 \\ \vdots & \vdots \\ \vdots & \vdots \\ i_{n-1} & m-1 \\ i_n & t_n \end{vmatrix}$$

After the voltage change matrix A and current level matrix WF have been defined, it is then possible to provide a cell selection matrix X through minimizing state changes in the cell selection matrix X and minimizing the cost of switching at high current levels while applying a cell voltage range rule and a non-zero element rule, step 28, which matrix X is typically a binary matrix where a one may indicate that a cell is to be switched on and a zero that it is to be switched off.

The current level matrix WF, which provides weighting factors for the pulse pattern of the cell selection matrix, i.e. for the coefficients of the cell selection matrix X, associates the pulse pattern with the normalized current level and shows the cost (in energy) of switching at each instance of time.

In order to be able to set the coefficients of the cell selection matrix X, some basic rules are first applied.

One first rule is that the number of zero-elements should be the same in the cell selection matrix X as in the voltage change matrix A. Another rule is that for each column of the extended voltage change matrix B, the total voltage change has to be below the maximum cell voltage and with advantage within the cell voltage range. This means that the sums of each column has to be below the maximum cell voltage and with advantage also above the minimum cell voltage.

A number of candidate cell selection matrices that fulfill these rules may then be obtained, where one is to be used as the cell selection matrix X.

The cell selection matrix to be used is more particularly obtained based on two minimizing constraints.

One constraint may be that the number of states changes in the cell section matrix X is minimized.

Another constraint may be that the state changes at high current levels should be minimized. The minimizing at high current levels may be obtained through minimizing a relationship between the status changes of the cell selection matrix and phase arm current levels. A status change may here be a change from being inserted to non-inserted and vice versa. This may involve a combining of a state change value with a current level value. If a state change is assigned a value, for instance a value of one, it is then possible to form a state change matrix Xa.

One example of a state change matrix Xa that would be formed based on the cell selection matrix exemplified for FIG. 5 would then be:

$$Xa = \begin{vmatrix} 0 & 0 & 0 & 1 & 0 \\ 1 & 0 & 0 & 0 & 0 \\ 0 & 1 & 1 & 1 & 0 \\ 0 & 0 & 0 & 0 & 1 \\ 1 & 1 & 0 & 1 & 0 \\ 0 & 0 & 1 & 1 & 1 \\ 0 & 0 & 0 & 0 & 1 \\ 1 & 0 & 0 & 0 & 0 \end{vmatrix}$$

Each column of the matrix Xa could then be multiplied with the transposed current level matrix $WF^T$ and through forming a sum of all these multiplications it is then possible to obtain a measure of the cost of switching with regard to the phase arm current.

The candidate cell selection matrix that best fulfills both these two minimizing criteria, i.e. the one having the lowest cost of switching and the lowest amount of state changes, is then selected as the cell selection matrix that is to be used.

The minimizing ensures a minimum switching frequency which also considers low current switching. The cell voltage limitation rule guarantees the capacitor voltage balancing and finally the non-zero value rule secures the following of the reference voltage.

The obtained cell selection matrix X is then used for selecting cells in the operation.

After the coefficients of the matrix X have been determined in this way, the cells are then selected for insertion in the phase arm by the balancing control element 14 according to the cell selection matrix X, step 30, where the cells of a row are inserted at the corresponding instance of time. It can in this way be seen that the cells are selected for contributing to an AC voltage output from the first AC terminal AC1 of the voltage source converter 10 based on the reference voltage Vref of the phase arm and the magnitude I of the phase arm current.

The calculations made above (A and X matrices) may be performed at any time instances in the period of the reference voltage, but is with advantage performed at the instance of a current zero crossing. The organizing may be repeated when a new current zero crossing is reached. This new zero crossing may be the following zero-crossing that is associated with the same type of activity (charging or discharging) as the previous triggering zero-crossing, which in the example given here is a zero-crossing that initiates a charging interval.

It can be seen that in this way zero current crossings are utilized for switching for balancing purposes (lossless switching).

The switching for balancing purposes at high current levels is furthermore minimized, which leads to lower total switching losses. This is obtained through only switching necessary cells (according to the reference voltage) at the lowest possible switching frequency.

Figure 8:
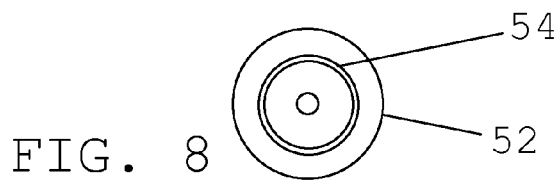
Figure 7:
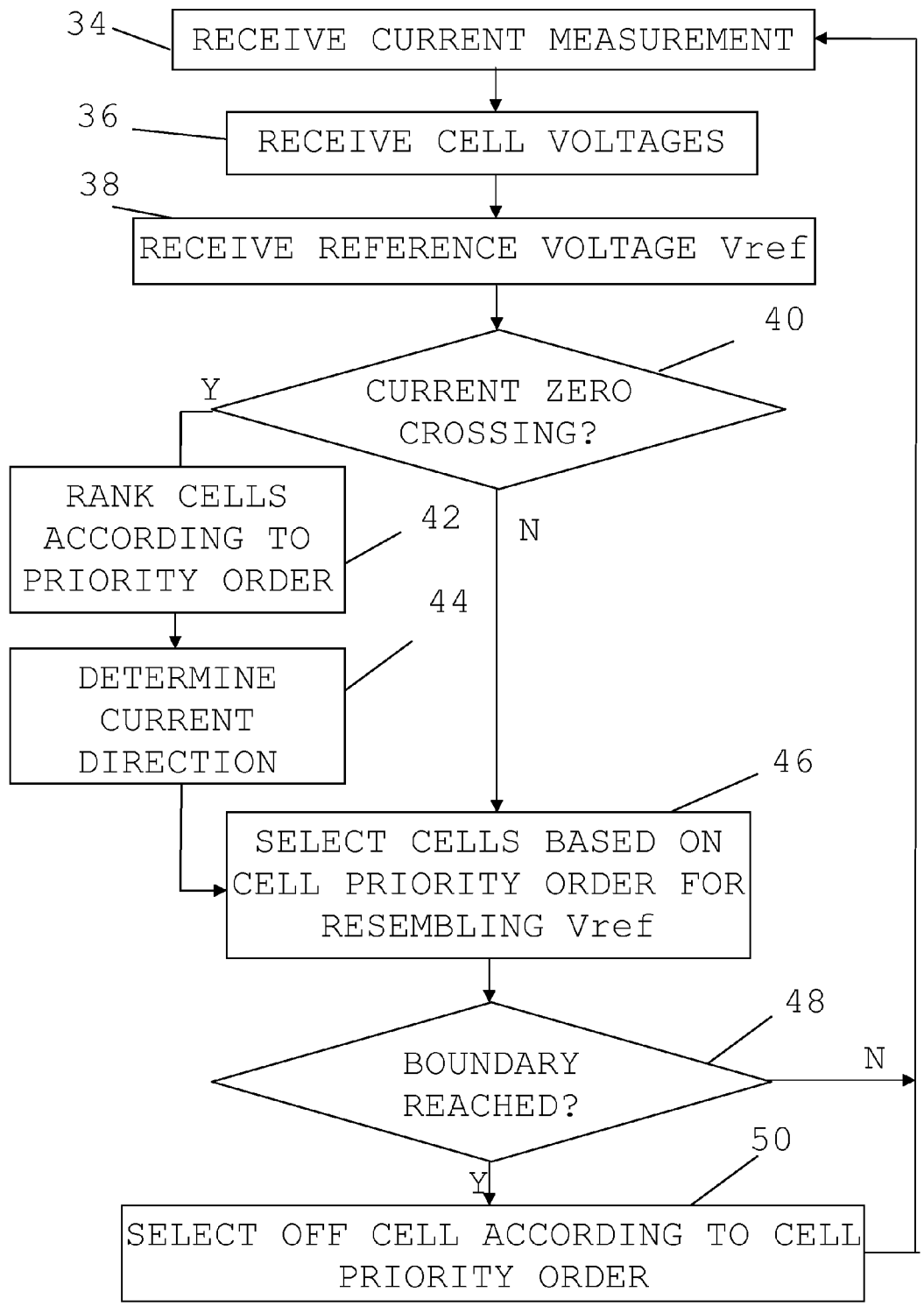

A more hands-on type of method requiring less processing while still giving satisfactory results will now be described in relation FIG. 8, which shows a number of method steps in a method of selecting cells according to a second embodiment.

The current is continuously measured by the current sensor CS and reported to the voltage balancing control element 14, which thereby receives current measurements step 34. Also the cell voltages of the cells are obtained from the cells by the voltage balancing control element 14, which thus also receives the cell voltages, step 36. The reference voltage providing element 16 also provides the reference voltage Vref to the voltage balancing element 14 and thereby the voltage balancing element 14 also receives the reference voltage Vref, step 38.

The voltage balancing element 16 then compares the current level of the measured current with a current level threshold, which threshold may be a zero level threshold. Thereby the voltage balancing element 14 determines if a current zero crossing is reached, step 40.

If a current zero crossing is reached, step 40, the voltage balancing element 14 organizes the cells for limiting switching at high phase arm current levels. This organizing, which is thus is triggered by the current zero crossing, comprises ranking the cell voltages according to a cell voltage priority order, step 42. The cells are thereby ranked according to their cell voltages. The priority order may be a falling order starting with the highest cell voltage and ending with the lowest cell voltage or vice-versa from the lowest cell voltage to highest one. The cell voltages are here furthermore in the cell voltage range between the upper and lower boundary, Vmin and Vmax. The prioritizing may also be considered to be the forming of a sorted list, which list is created in the beginning, i.e. at a current zero crossing, of each charging or discharging period in either a descending or ascending way (zero crossing time).

The direction of current flow in the phase arm after the zero crossing may also be determined, step 44, where the direction may be determined to be the opposite to the direction of current before the zero crossing.

Thereafter the reference voltage of the corresponding time is used and cells selected for contributing to providing a voltage corresponding to the reference voltage Vref, step 46. The cells are thus selected based on their ranking. The cells are furthermore selected, starting from the arm current zero crossing. The cells are furthermore selected based on the cell priority order for resembling the reference voltage Vref. This means that the cells are selected in a number that is sufficient for meeting the reference voltage Vref at the discreet switching time of the arm current zero crossing. They are furthermore selected in the priority order. This also means that if for instance four cells are to be selected, four cells from the top of the priority order are selected. In the example of a sorted list, the needed cells may then be considered to be inserted from the sorted list (1 to N_level), where N_level is the required voltage level.

In case there was no zero-crossing, step 40, cells are directly selected for contributing to a voltage corresponding to the reference voltage Vref, step 46. In this case the cells are selected based on a previously determined cell priority order.

The number of cells selected are thus a number that is required for meeting the reference voltage Vref. The cells are furthermore cells selected according to the priority order.

Thereafter there is an investigation of if any cell reaches a boundary corresponding to the current direction, step 48, where the boundary associated with a positive current that charges the cells is the upper boundary Vmax and the boundary associated with a negative current, i.e. a current discharging the cells is the lower boundary Vmin. If no cell reaches a boundary, step 48, the cells are retained until the next discreet point in time, where measurements are made, steps 34 and 36, reference voltage is obtained, step 38, and a current zero crossing investigation is again made, step 40.

However, if a cell reaches the boundary, step 48, then it is replaced with another cell that is selected, step 50. The selected cell is furthermore off, i.e. it is a non-inserted cell that is then switched for being inserted. The replacing cell is with advantage a lower ranked cell. It may for instance be the first off cell in the cell priority order. It may also be the last cell in the priority order. It may as another example a randomly selected off cell. The cell that has reached the boundary is then removed from the priority order and replaced by a non-selected cell, i.e. a cell having a lower priority than the selected cells. This may thus lead to the cell reaching the boundary being switched off and the replacing cell being switched on.

In the case of a positive current, the selected cell may be the cell that has the lowest priority. This means that as soon as the first cell in the list charges to the upper boundary Vmax (maximum voltage limit for each cell), this cell will switch off and the last off cell in the sorted list will switch on instead.

In a case of a negative current the replacing cell may be the non-selected cell having the highest voltage. This means that as soon as a cell reaches the lower boundary Vmin, this cell will switch off and the first off cell in the sorted list will get switched on instead.

The replacing cell, in both the above mentioned directions, may then be retained in the next switching time instance even if it would nominally have a priority that is too low to be selected next. However it is possible that it is not selected if the number of cells used to meet the reference voltage requirement is reduced as compared with the previous switching time instance. The cell that has reached the boundary is furthermore removed from the sorted list. The priority or rank of it may be removed. It does thus not have any priority setting and can therefore not be selected.

Thereafter the method continues to handle the next discreet point where measurements are made, reference voltage is obtained and a current zero crossing investigation is again made.

This procedure is then continued up until the next time that a zero-crossing is reached, i.e. when a new arm current zero crossing is reached, which new zero crossing may be the following zero-crossing. When this new zero-crossing is reached a new organizing according to priority is made.

It can in this way be seen that the cells are selected for contributing to an AC voltage output from the multilevel converter based on the reference voltage Vref of the phase arm and a magnitude of a phase arm current I.

In this way the voltage balancing element reduces the switching at high current levels and thereby the switching losses are lowered. The amount of computing needed is furthermore low and thereby the operation is also fast.

It is possible to omit the minimum voltage limitation. This is the case if the voltage source converter is to operate as an inverter with a high modulation index, where the cells may be allowed to discharge without any limitation.

It is possible that the control unit is provided separately from the multilevel converter. In this case, it may be considered to be a cell selecting control device that communicates with the multilevel converter for controlling the operation of this multilevel converter.

The control unit may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter. FIG. 8 shows one such CD Rom disc 52 with computer program code 54.

From the foregoing discussion it is evident that the present invention can be varied in a multitude of ways. It shall consequently be realized that the present invention is only to be limited by the following claims.

The invention claimed is:

1. A method of selecting switching cells for voltage contribution in a phase arm of a multilevel converter operating to convert between alternating current and direct current, the method being performed by a voltage balancing element of the converter and comprising: organizing, triggered by a current zero crossing of a phase arm current, the cells for limiting switching at high phase arm current levels; and selecting cells for contributing to an AC voltage output from the multilevel converter based on a reference voltage of the phase arm and the magnitude of the phase arm current.

2. The method according to claim 1, wherein the organizing is repeated when a new current zero crossing is reached.

3. The method according to claim 1, further comprising obtaining cell voltages of the cells, wherein the organizing comprises ranking the cells according to their cell voltages and the selecting also comprises selecting based on the ranking.

4. The method according to claim 3, wherein a high voltage corresponds to a high rank.

5. The method according to claim 3, wherein the ranking is made at said triggering current zero crossing and the selecting comprises selecting, starting from said current zero crossing, the cells having the highest rank first and replacing a selected cell with a lower ranked cell if the cell voltage reaches a cell voltage range boundary.

6. The method according to claim 5, wherein the step of selecting is made at recurring discreet switching times and a replacement cell selected at one discreet switching time is retained at a following discreet switching time.

7. The method according to claim 5, further comprising removing the rank of a cell reaching a boundary.

8. The method according to claim 1, wherein the organizing comprises forming a voltage change matrix defining a relationship between cells to be used for meeting the reference voltage and the change in cell voltage caused by the phase arm current and forming a cell selection matrix based on the current level matrix and voltage change matrix, where the coefficients of the cell selection matrix are obtained through minimizing the number of state changes in the cell selection matrix and minimizing a relationship between state changes of the cell selection matrix and phase arm current levels and the selecting is based on the formed cell selection matrix.

9. The method according to claim 8, further comprising applying constraints that the cell voltages are to be within cell voltage boundaries and that the number of non-zero elements are the same in the cell selection matrix and voltage change matrix.

10. A cell selecting control device for a multilevel converter operating to convert between alternating current and direct current and comprising at least one phase arm with cells, the cell selecting control device comprising: a balancing control element configured to: obtain a reference voltage for the phase arm; obtain a measurement of the current running through the phase arm; organize, triggered by a current zero crossing of the phase arm current, the cells for limiting switching at high phase arm current levels; and select cells for contributing to an AC voltage output from the multilevel converter based on the reference voltage and the magnitude of the phase arm current.

11. The cell selecting control device according to claim 10, wherein the balancing control element is configured to repeat the organizing when a new current zero crossing is reached.

12. The cell selecting control device according to claim 10, wherein the balancing control element is configured to obtain cell voltages of the cells, to rank the cells according to their cell voltages when performing organizing and to select cells based on their rank when performing selecting.

13. The cell selecting control device according to claim 12, wherein the balancing control element is configured to perform the ranking at said triggering current zero crossing and when selecting being further configured to select, starting from said current zero crossing, the cells having the highest rank first and replace a selected cell with a lower ranked cell if the cell voltage reaches a cell voltage range boundary.

14. The cell selecting control device according to claim 13, wherein the balancing control element is configured to perform selecting at recurring discreet switching times and retain a replacement cell selected at one discreet switching time at a following discreet switching time.

15. The cell selecting control device according to claim 13, wherein the balancing control element is configured to remove the rank of a cell reaching a boundary.

16. The cell selecting control device according to claim 10, wherein the balancing control element, when performing organizing, is configured to form a voltage change matrix defining a relationship between cells to be used for meeting the reference voltage and the change in cell voltage caused by the phase arm current, and to form a cell selection matrix based on the current level matrix and voltage change matrix, where the coefficients of the cell selection matrix are obtained through minimizing the number of state changes in the cell selection matrix and minimizing a relationship between state changes of the cell selection matrix and phase arm current levels and the balancing control element, when performing selecting, is configured to select cells based on the formed cell selection matrix.

17. The cell selecting control device according to claim 16, wherein the balancing control element, when obtaining coefficients through minimizing state changes, is further configured to apply constraints that the cell voltages are to be within cell voltage boundaries and that the number of non-zero elements are the same in the cell selection matrix and voltage change matrix.

18. A multilevel converter operating to convert between alternating current and direct current and comprising: at least one phase arm with a number of cells; a phase arm current detector configured to measure the current running through the phase arm; and a control unit, said control unit comprising: a voltage level control element configured to provide a reference voltage for the phase arm; and the balancing control element according to claim 10.

19. A computer program product for selecting cells for voltage contribution in a phase arm of a voltage source converter operating to convert between alternating current and direct current, said computer program product being provided as a data carrier comprising computer program code configured to cause a balancing control element of a cell selecting control device to, when said computer program code is loaded into the cell selecting control device: obtain a reference voltage for the phase arm; obtain measurements of the current running through the phase arm; organize, triggered by a current zero crossing of the phase arm current, the cells for limiting switching at high phase arm current levels; and select cells for contributing to an AC voltage output from the multilevel converter based on the reference voltage and the magnitude of the phase arm current.

20. The method according to claim 2, further comprising obtaining cell voltages of the cells, wherein the organizing comprises ranking the cells according to their cell voltages and the selecting also comprises selecting based on the ranking.

* * * * *